US009160591B2

(12) United States Patent
Wei et al.

(10) Patent No.: US 9,160,591 B2
(45) Date of Patent: Oct. 13, 2015

(54) SIGNAL PROCESSING METHOD AND ASSOCIATED DEVICE, AND METHOD FOR DETERMINING WHETHER SPECTRUM OF MULTICARRIER SIGNAL IS REVERSED (71) Applicant: MStar Semiconductor, Inc., Hsinchu Hsien (TW)

(72) Inventors: Fong-Shih Wei, Zhubei (TW); Yi-Ying Liao, Zhubei (TW); Ko-Yin Lai, Zhubei (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/516,677

(22) Filed: Oct. 17, 2014

(65) Prior Publication Data
US 2015/0110208 A1 Apr. 23, 2015

(30) Foreign Application Priority Data

Oct. 17, 2013 (TW) .............................. 102137556 A (51) Int. Cl.
*H04L 27/26* (2006.01)
(52) U.S. Cl.
CPC .................................. *H04L 27/2602* (2013.01)
(58) Field of Classification Search
CPC ............... H04L 2027/0026; H04L 2027/0065; H04L 27/265; H04L 27/2657; H04L 27/2663; H04L 7/0016; H04L 7/042; H04L 2025/03414; H04L 27/2602
USPC .......................... 375/260, 340, 343, 344, 354
See application file for complete search history.

(56) References Cited

U.S. PATENT DOCUMENTS

| 8,064,553 B2 | 11/2011 | Gu et al. |
| 2007/0041312 A1 | 2/2007 | Kim |
| 2010/0296002 A1* | 11/2010 | Cheng et al. .................. 348/725 |
| 2014/0185717 A1* | 7/2014 | Lee et al. ...................... 375/343 |

FOREIGN PATENT DOCUMENTS

WO 2008023253 A2 2/2008

OTHER PUBLICATIONS

Taiwan Office Action dated Feb. 9, 2015, 6 pages.

* cited by examiner

*Primary Examiner* — Leon Flores
(74) *Attorney, Agent, or Firm* — Edell, Shapiro & Finnan, LLC (57) ABSTRACT

A signal processing method includes: converting an analog signal to a digital signal; converting the digital signal from a time domain to a frequency domain, the frequency-domain digital signal including a plurality of sets of data exhibiting a predetermined order associated with frequencies respectively corresponding to the data; performing a correlation operation according to the data and the predetermined order to generate a forward correlation result; performing the correlation operation according to the data and a reverse order of the predetermined order to generate a reverse correlation result; selectively generating a control signal according to the forward and reverse correlation results; and processing the digital signal in the time domain according to the control signal so that the data generated in the subsequent step of converting the digital signal from the time domain to the frequency domain exhibit the predetermined order or the reverse order.

16 Claims, 9 Drawing Sheets

SIGNAL PROCESSING METHOD AND ASSOCIATED DEVICE, AND METHOD FOR DETERMINING WHETHER SPECTRUM OF MULTICARRIER SIGNAL IS REVERSED

This application claims the benefit of Taiwan application Serial No. 102137556, filed Oct. 17, 2013, the subject matter of which is incorporated herein by reference.

BACKGROUND OF THE INVENTION

1. Field of the Invention

The invention relates in general to a signal processing device and associated method, and more particularly to a signal processing device and associated method capable of determining whether a spectrum of a multicarrier signal is reversed.

2. Description of the Related Art

Figure 1:
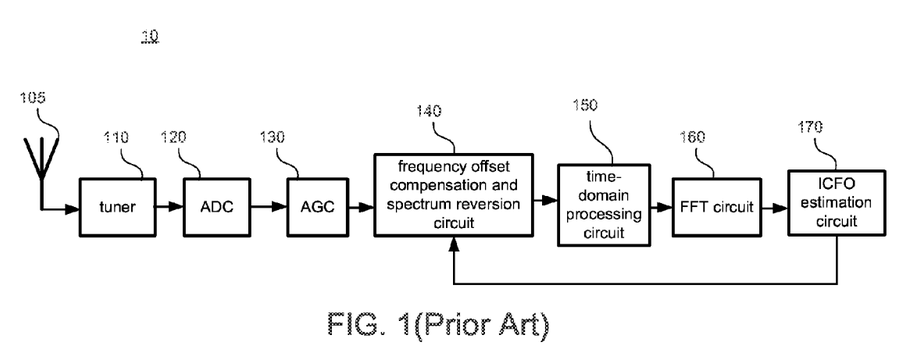
FIG. 1 is a block diagram of a conventional OFDM baseband receiver applied to a digital television.

FIG. 1 shows a block diagram of a conventional orthogonal frequency division multiplexing (OFDM) baseband receiver for a digital television. The OFDM baseband receiver 10, suitable for Integrated Services Digital Broadcasting-Terrestrial (ISDB-T) and Digital Video Broadcasting-Terrestrial (DVB-T) digital televisions, includes an antenna 105, a tuner 110, an analog-to-digital converter (ADC) 120, an automatic gain control (AGC) 130, a frequency offset compensation and spectrum reversion circuit 140, a time-domain processing circuit 150, a fast Fourier transform (FFT) circuit 160, and an integer carrier frequency offset (ICFO) estimation circuit 170. After receiving an RF signal from the antenna 105, the tuner 110 selects a target channel from multiple channels, and down-converts the RF signal of the target channel to an intermediate low frequency signal. The intermediate low frequency analog signal is converted by the ADC 120 to a digital signal that is then transmitted to the AGC 130 to adjust a gain of the signal. The frequency offset compensation and spectrum reversion circuit 140 performs frequency offset compensation on the digital signal. The time-domain processing circuit 150 at the next stage processes the digital signal by such as a synchronization process, such that a sampling period of symbols at the signal receiver end may be consistent with that at the signal transmitter end. The FFT circuit 160 converts the digital signal from time domain to frequency domain. The ICFO estimation circuit 170 estimates a carrier frequency offset of the digital signal. The frequency offset compensation and spectrum reversion circuit 140 performs offset frequency compensation on the digital signal according to an estimation result of the ICFO estimation circuit 170.

Figure 2:
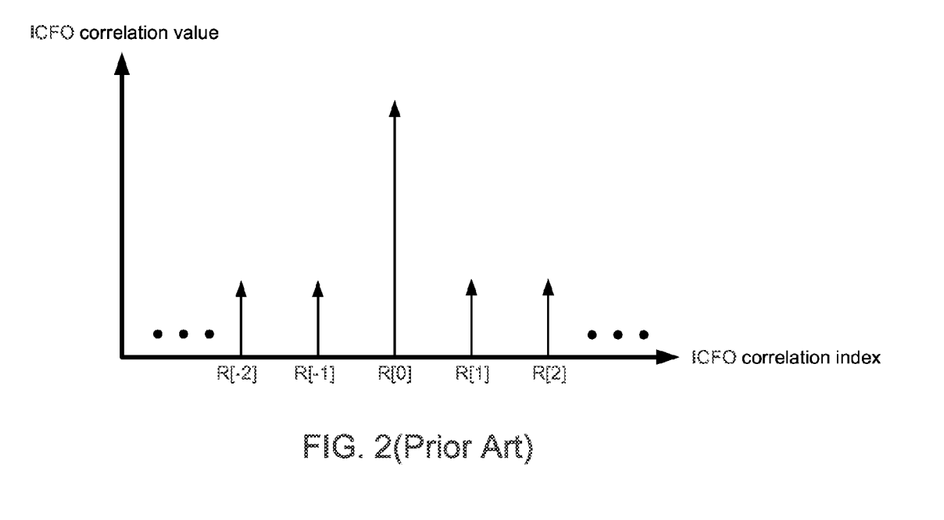
FIG. 2 is a relationship diagram between an ICFO correlation value and an ICFO correlation index.

The ICFO estimation circuit 170 performs a correlation operation on the digital signal to obtain a plurality of correlation values, according to which the carrier frequency offset of the digital signal can be obtained. More specifically, the carrier frequency offset includes an integer carrier frequency offset (ICFO) and a fractional carrier frequency offset (FCFO), and the correlation values may be further categorized into ICFO correlation values and FCFO correlation values. FIG. 2 shows a relationship diagram between an ICFO correlation value and an ICFO correlation index. As seen in FIG. 2, the ICFO correlation value appears as an extremely large value (or a maximum value) at a position where the ICFO correlation index is R[0]; the ICFO correlation values corresponding to the neighboring ICFO correlation indices are similar, and are quite different from the ICFO correlation value corresponding to the correlation index R[0] in comparison. The frequency corresponding to the ICFO correlation index R[0] may indicate a frequency offset, e.g., 6000 Hz, and the frequency offset compensation and spectrum reversion circuit 140 in FIG. 1 then compensates the frequency offset of the digital signal according to the indicated frequency offset.

Figure 3:
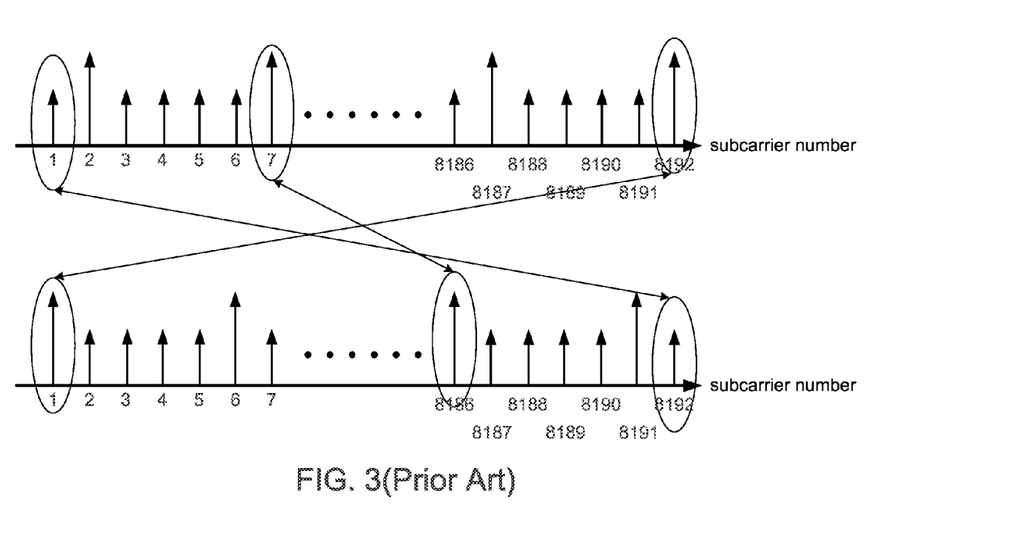
FIG. 3 is a spectrum diagram of a symbol of a signal based on OFDM modulation.

FIG. 3 shows a spectrum diagram of a symbol of a signal based on OFDM modulation. In this example, it is assumed that one symbol includes 8192 subcarriers. In FIG. 3, the upper part shows a common spectrum (or referred to as a forward spectrum), and the lower part shows a reversed spectrum. The reversed spectrum and the forward spectrum are left-right reversed, also known as laterally reversed. That is, a subcarrier originally having a subcarrier number 1 in the forward spectrum appears as a subcarrier (having a subcarrier number 8192) at the end of the reversed spectrum, a subcarrier originally located at the end of the forward spectrum appears at the position of the subcarrier having the subcarrier number 1 in the reversed spectrum, and other subcarriers also appear as laterally reversed regarding the spectrum as the center. The forward spectrum and the reversed spectrum together exhibit a characteristic—for any of the subcarriers, a sum of the subcarrier numbers in the forward spectrum and in the reverse spectrum is a constant value. For example, the circled spectrum components in the forward spectrum and the reversed spectrum have numbers that add up to a sum of 8193.

One reason causing the reversed spectrum is due to different spectrum processing methods at the RF signal transmitter end and at the tuner 110. For example, the transmitter end transmits signals by a reversed spectrum, whereas the tuner 110 processes the RF signal by a processing method for a forward spectrum, hence a reversed spectrum; and vice versa. If the ICFO estimation circuit 170 operates based on an reversed spectrum, a correlation result generated is similar to the relationship diagram in FIG. 2. That is, although a maximum ICFO correlation value is obtained, this maximum ICFO correlation value is still smaller than the maximum ICFO correlation value in the forward spectrum and does not correspond to frequency of a correct carrier frequency offset.

Regarding the correct carrier frequency offset, assume that after another correlation operation performed by the frequency offset compensation and spectrum reversion circuit 140, the ICFO correlation value obtained indicates that the carrier frequency offset is 0. That is, when the ICFO correlation value obtained from again performing the correlation operation indicates that the carrier frequency offset is 0, it means that the OFDM baseband receiver 10 processes the correct spectrum. Conversely, regarding an incorrect carrier frequency offset, assume that after another correlation operation performed by the frequency offset compensation and spectrum reversion circuit 140, the ICFO correlation value obtained indicates that the carrier frequency offset is not 0. That is, when the ICFO correlation value obtained from again performing the correlation operation indicates that the carrier frequency offset is not 0, it means that the OFDM baseband receiver 10 may have processed a reversed spectrum by a processing method for a forward spectrum. When the ICFO estimation circuit 170 discovers that the spectrum is reversed, a control signal is sent to the frequency offset compensation and spectrum reversion circuit 140 to control the frequency offset compensation and spectrum reversion circuit 140 to process the digital signal in the time domain, such that the processed digital signal, after undergoing the FFT circuit 160, displays a forward spectrum in the frequency domain. The processes of the frequency offset compensation and spectrum reversion circuit 140 include swapping the imaginary part and the real part (IQ) swap) or obtaining the complex conjugate of the digital signal. The processed result is further processed by FFT to obtain the reversed spectrum.

When the OFDM baseband receiver 10 processes a forward spectrum, the ICFO estimation circuit 170 at least needs to perform two correlation operations (one for obtaining the carrier frequency offset, and the other for confirming that the compensated carrier frequency offset is 0) to complete the frequency offset compensation. Further, when the OFDM baseband receiver 10 processes a reversed spectrum, the ICFO estimation circuit 170 needs to perform four correlation operations (two for an reversed spectrum and two for a forward spectrum) to complete the frequency offset compensation. As a result, overall efficiency is severely degraded when the OFDM baseband receiver 10 encounters a reversed spectrum.

SUMMARY OF THE INVENTION

The invention is directed to a signal processing device and a signal processing method capable of quickly determining whether a spectrum of a multicarrier signal in a frequency domain is reversed.

The present invention discloses a signal processing device. The signal processing device includes: an analog-to-digital converter (ADC), configured to convert an analog signal to a digital signal; a conversion circuit, configured to convert the digital signal from a time domain to a frequency domain, the digital signal converted to the frequency domain including a plurality of sets of data exhibiting a predetermined order, wherein the predetermined order is associated with frequencies respectively corresponding to the data; a calculation circuit, coupled to the conversion circuit, configured to perform a correlation operation according to the data and the predetermined order to obtain a forward correlation result, to perform the correlation operation according to the data and a reverse order of the predetermined order to generate a reverse correlation result, and to selectively generate a control signal according to the forward correlation result and the reverse correlation result; and a data processing circuit, coupled between the ADC and the converting circuit, configured to process the digital signal in the time domain according to the control signal, so that the data subsequently generated by the conversion circuit exhibits one of the predetermined order and the reverse order.

The present invention further discloses a signal processing method. The signal processing method includes: converting an analog signal to a digital signal; converting the digital signal from a time domain to a frequency domain, the digital signal converted to the frequency domain including a plurality of sets of data exhibiting a predetermined order, wherein the predetermined order is associated with frequencies respectively corresponding to the data; performing a correlation operation according to the data and the predetermined order to generate a forward correlation result; performing the correlation operation according to the data and a reverse order of the predetermined order to generate a reverse correlation result; selectively generating a control signal according to the forward correlation result and the reverse correlation result; and processing the digital signal in the time domain according to the control signal, so that the data generated in the subsequent step of converting the digital signal from the time domain to the frequency domain exhibit one of the predetermined order and the reverse order.

The present invention further discloses a method for determining whether a spectrum of a multicarrier signal is reversed. The multicarrier signal includes a plurality of sets of data exhibiting a predetermined order, wherein the predetermined order is associated with frequencies respectively corresponding to the data. The method includes: performing a correlation operation according to the data and the predetermined order to generate a forward correlation result; performing the correlation operation according to the data and a reverse order of the predetermined order to generate a reverse correlation result; and determining whether the spectrum of the multicarrier signal is reversed according to the forward correlation result and the reverse correlation result.

The signal processing device and method are capable of quickly determining whether a spectrum of a multicarrier signal is reversed by performing two correlation operations on the signal in the frequency domain—one to obtain associated values according to a predetermined number order of subcarriers, and the other to obtain associated values according to a reverse order of the predetermined number order of the subcarriers. An ICFO correlation value is then obtained. According to the results of the two correlation operations, whether the spectrum of the signal is reversed and the carrier frequency offset of the signal can be learned at the same time, and so spectrum reversion and carrier frequency offset compensation can be simultaneously performed. Compared to the prior art, the present invention only requires two correlation operations to learn both whether the spectrum of the signal is reversed and the carrier frequency offset of the signal. In contrast, in the prior art, the same result can only be obtained by respectively performing two correlation operations on the forward and reverse spectra. Further, the two correlation operations of the present invention are performed according to the same data, whereas the two consecutive correlation operations in the prior art are performed based on different data. Further, in the prior art, between the two consecutive correlation operations, calculations for carrier frequency offset compensation and FFT need to be carried out, resulting in a time-consuming and inefficient determination procedure. Therefore, the present invention enhances signal processing efficiency, and more quickly learns both whether the spectrum of the signal is reversed and the carrier frequency offset of the signal.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on the general definition in the technical field of the application. If the application describes or explains one or some terms, definitions of the terms are based on the description or explanation of the application.

The present invention discloses a signal processing device and associated method and a method for determining whether a spectrum of a multicarrier signal is reversed. The device and method are applicable to a multicarrier signal. In possible implementation, one skilled person in the art may choose equivalent elements or steps to implement the disclosure based on the disclosure of the application. That is, the implementation of the disclosure is not limited by the embodiments disclosed in the disclosure. Further, the signal processing method of the disclosure may be implemented by the signal processing device of the disclosure or an equivalent device. Without affecting the full disclosure and possible implementation of the method of the disclosure, the description of the method focuses on the steps of the method instead of hardware.

Figure 4:
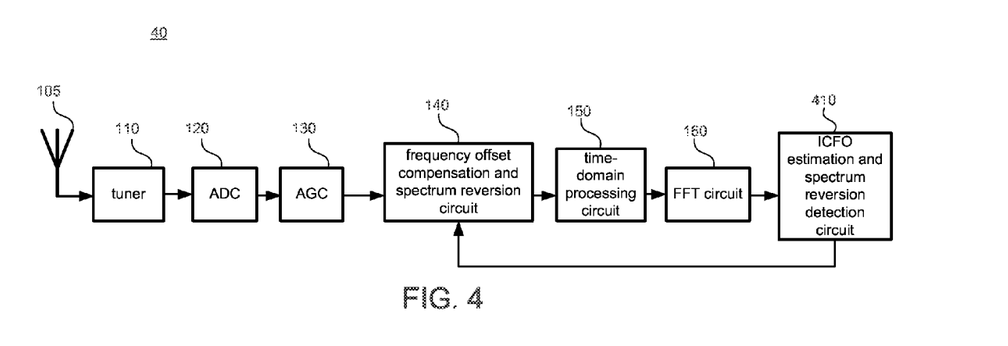
FIG. 4 is a block diagram of an OFDM baseband receiver for a digital television according to an embodiment of the present invention.

FIG. 4 shows a block diagram of an OFDM baseband receiver for a digital television according to an embodiment of the present invention. Compared to the OFDM baseband receiver 10, the OFDM baseband receiver 40 replaces the original ICFO estimation circuit 170 by an ICFO estimation and spectrum reversion detection circuit 410. Details of other elements having the same functions are omitted herein. Operation principles of the ICFO estimation and spectrum reversion detection circuit 410 are summarized below. A correlation operation is first performed according to a forward order of numbers of subcarriers of a spectrum of a symbol to obtain a correlation result corresponding to the forward order, and the correlation operation is performed according to a reverse order of the numbers of the subcarriers of the spectrum of the symbol to obtain a correlation result corresponding to the reverse order. Next, the correlation result corresponding to the forward order and the correlation result corresponding to the reverse order are compared to determine whether the spectrum is reversed. Details of the operations are given as follows.

Figure 5:
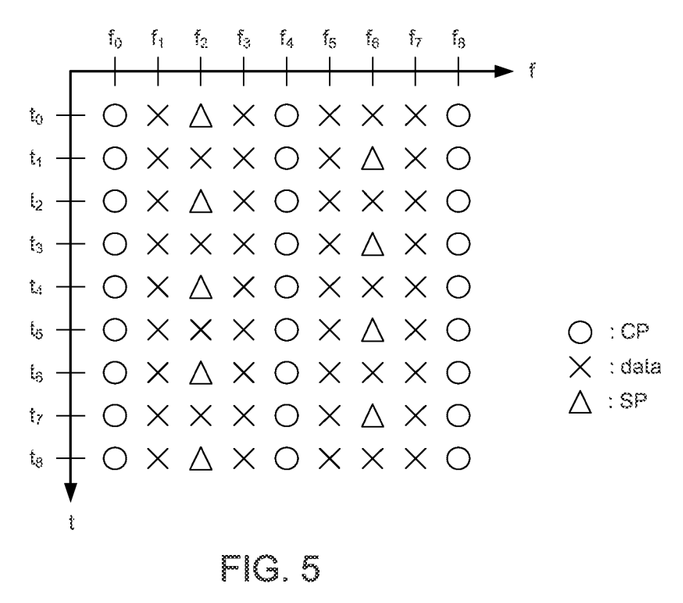
FIG. 5 is a schematic diagram of relations of a symbol and subcarriers of a DVB-T digital television signal.

Taking a DVB-T television signal for example, in a symbol of the television signal, certain fixed subcarriers are provided with pilot signals for identification purposes. FIG. 5 shows a schematic diagram of relations of a symbol and subcarriers of a DVB-T digital television signal. In one symbol, subcarriers with frequencies $f_0$, $f_4$ and $f_8$ carry continual pilot (CP) signals (represented by ○), other subcarriers carry data signals (represented by X) and scattered pilot (SP) signals (represented by Δ). The CP signals have constant values and higher energy levels, and such characteristics are utilized by the ICFO estimation and spectrum reversion detection circuit 410 to calculate the ICFO correlation value of the digital signal to further determine whether the spectrum is reversed and the carrier frequency offset. Assume that $R_{n,k}$ and $R_{n-1,k}$ respectively represent outputs of the FFT circuit 160 at a $k^{th}$ subcarrier of $n^{th}$ and $(n-1)^{th}$ symbols, $D_{n,k}$ and $D_{n-1,k}$ respectively represent data of the digital signal at the $n^{th}$ and $(n-1)^{th}$ symbols, and $H_{n,k}$ and $H_{n-1,k}$ respectively represent a channel gain of the $k^{th}$ subcarrier of $n^{th}$ and $(n-1)^{th}$ symbols. Thus:

$$R_{n,k} = |H_{n,k}| \cdot |D_{n,k}| \cdot e^{j\theta_{n,k}} \quad \text{equation (1)}$$

$$R^*_{n-1,k} = |H_{n-1,k}| \cdot |D_{n-1,k}| \cdot e^{j\theta_{n-1,k}} \quad \text{equation (2)}$$

Assuming that channel effects on the carriers change extremely slowly and the CP signals transmit constant values, the correlation product $R_{n,k} \cdot R^*_{n-1,k}$ may be represented as:

$$R_{n,k} \cdot R^*_{n-1,k} = |H_k^2| \cdot |D_k|^2 \cdot e^{j2\pi\Delta f_{CP}} \quad \text{equation (3)}$$

In equation (3), $\Delta f_{CP}$ is a frequency difference between two consecutive symbols. Thus, the ICFO correlation value may be represented as $$\text{abs}\left(\sum_{k \in CP} R_{n,k} \cdot R^*_{n-1,k}\right),$$

where k represents the subcarrier carrying the CP signals, e.g., the subcarriers with frequencies $f_0$, $f_4$ and $f_8$ in FIG. 5. It should be noted that FIG. 5 is for illustrative purposes, and which subcarriers in fact carry the CP signal is defined according to the modulation method of the digital signal.

Figure 6:
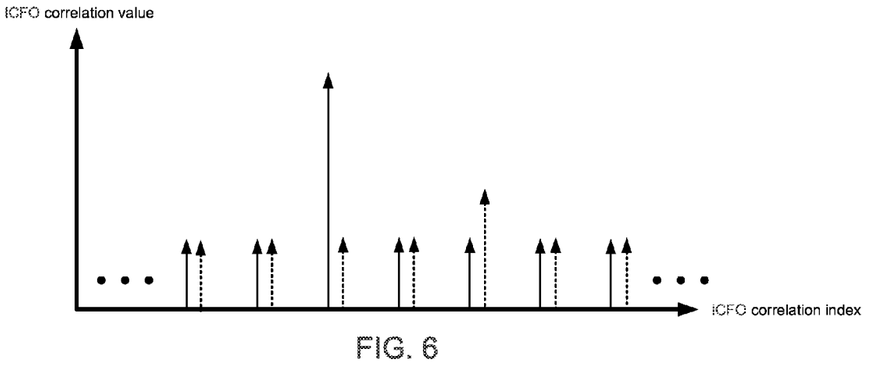
FIG. 6 is a relationship diagram between an ICFO correlation value and an ICFO correlation index of a forward spectrum and an reversed spectrum.

Again referring to FIG. 3, in the forward spectrum at the upper part of the diagram, frequency components having higher energy levels very likely correspond to subcarriers of CP signals as CP signals have higher energy levels. Therefore, by selecting a correlation product corresponding to the subcarriers with numbers 2, 7 . . . 8187 and 8192 when calculating the ICFO correlation value, an extremely large ICFO correlation value is obtained. However, in the event of a reversed spectrum, when the correlation product corresponding to the same subcarrier numbers (2, 7 . . . 8187 and 8192), the selected subcarrier numbers do not correspond to CP signals due to the reversed spectrum, and so the ICFO correlation value obtained is an apparent extremely large value. FIG. 6 shows a relationship diagram between an ICFO correlation value and an ICFO correlation index of a forward spectrum and a reversed spectrum. Referring to FIG. 6, solid-line arrows represent results of calculating ICFO correlation values based on a forward spectrum, and dotted-line arrows represent results of calculating ICFO correlation values based on a reversed spectrum. A maximum value of the ICFO correlation values corresponding to the reversed spectrum is smaller than a maximum value of the ICFO correlation values corresponding to the forward spectrum. Thus, the maximum value of the ICFO correlation values may be utilized to determine whether the spectrum of the digital signal currently processed by the OFDM baseband receiver 40 is forward or reversed.

Figure 7:
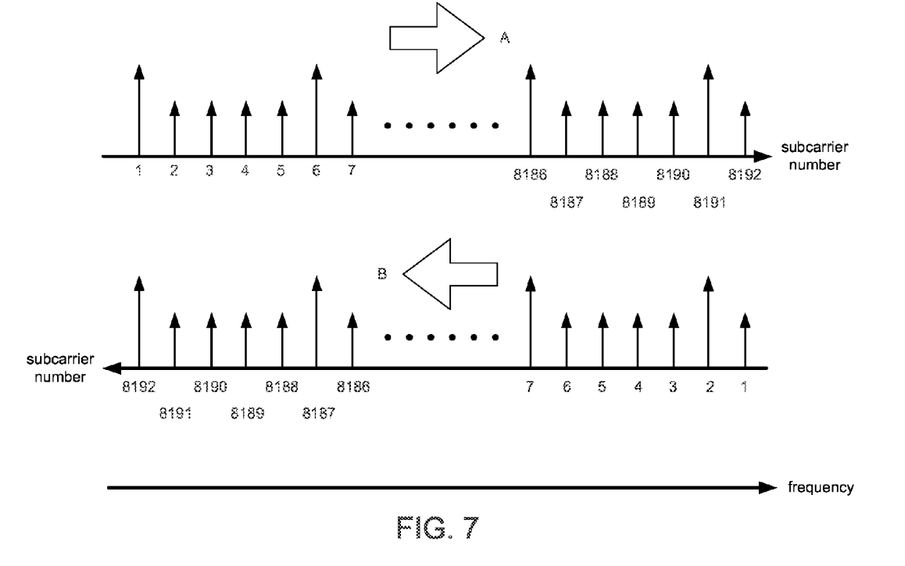
FIG. 7 is a schematic diagram of a spectrum of a symbol with a forward number order and a reverse number order according to an embodiment of the present invention.

For a reversed spectrum, the ICFO estimation and spectrum reversion detection circuit 410 of the present invention may obtain a correlation result corresponding to a forward spectrum through adjusting the selection method of correlation product in a reversed spectrum. FIG. 7 shows a schematic diagram of a spectrum of a symbol with a forward number order and a reverse number order according to an embodiment of the present invention. The reversed spectrum at the lower part of FIG. 3 is re-depicted at the upper part of FIG. 7, with a number order of the subcarriers as indicated by the arrow A. Regarding the number order of the subcarriers shown at the lower part of FIG. 7, an original end point of the subcarriers is now utilized as the start point, and an original start point of the subcarriers is now utilized as the end point, as the direction indicated by the arrow B. For a reversed spectrum, the ICFO estimation and spectrum reversion detection circuit 410 only needs to change the method for numbering the subcarriers from the original numbering direction A to the numbering direction B. Thus, when selecting the correlation product corresponding to the same subcarrier numbers, the ICFO estimation and spectrum reversion detection circuit 410 shall select the correlation product corresponding to the CP signals, and the ICFO correlation value accordingly calculated will indicate the correct carrier frequency offset.

In conclusion, for the ICFO estimation and spectrum reversion detection circuit 410, two ICFO correlation operations are performed on the spectrum outputted from the FFT circuit 160. In one of the ICFO correlation operations, an appropriate correlation product is selected according to an increasing order of the frequencies corresponding to the subcarrier numbers of the spectrum to obtain a forward ICFO correlation result, and the ICFO estimation and spectrum reversion detection circuit 410 records a maximum value of the correlation result and the corresponding carrier frequency offset by utilizing an internal storage unit (e.g., a memory or a buffer, not shown). In the other ICFO correlation operation, an appropriate correlation product is selected according to a decreasing order of the frequencies corresponding to the subcarrier numbers of the spectrum (i.e., a reverse order of the previous operation) to obtain a reverse ICFO correlation result. Having obtained the forward and reverse results, the ICFO estimation and spectrum reversion detection circuit 410 utilizes a comparing unit (not shown) to compare the maximum correlation value of the forward result and the maximum correlation value of the reverse result, sends the value of the carrier frequency offset corresponding to the larger of the maximum correlation values to the frequency offset compensation and spectrum reversion circuit 140, and instructs the frequency offset compensation and spectrum reversion circuit 140 whether to perform spectrum reversion on the digital signal. For example, when the maximum correlation value of the reverse result is larger than the maximum correlation value of the forward result, it means that the spectrum is reversed. Thus, the control signal that the ICFO estimation and spectrum reversion detection circuit 410 sends to the frequency offset compensation and spectrum reversion circuit 140 includes the value of the carrier frequency offset and the instruction of performing spectrum reversion. Conversely, when the maximum correlation value of the forward result is larger than the maximum correlation value of the reverse result, it means that the spectrum is correct. Thus, the control signal that the ICFO estimation and spectrum reversion detection circuit 410 sends to the frequency offset compensation and spectrum reversion circuit 140 includes the value of the carrier frequency offset and the instruction of maintaining the spectrum, i.e., spectrum reversion need not be performed. The frequency offset compensation and spectrum reversion circuit 140 then performs operations of frequency offset compensation and/or spectrum reversion on the digital signal according to the control signal. Details of the spectrum reversion are previously disclosed and shall be omitted herein.

Figure 8:
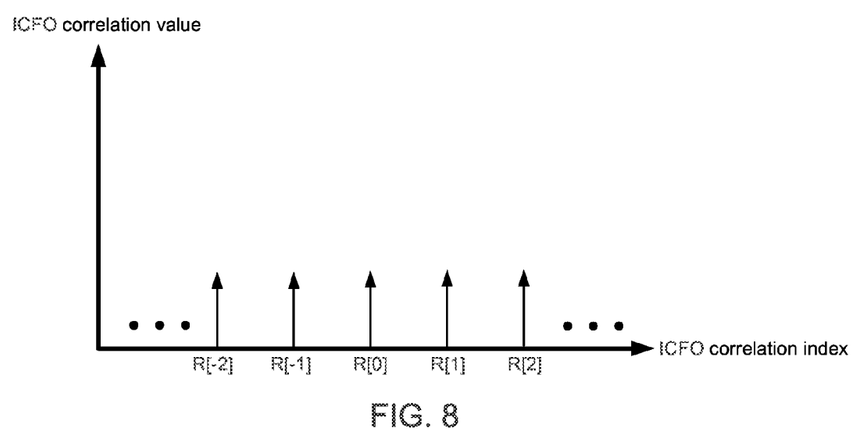
FIG. 8 is a relationship diagram between an ICFO correlation value and an ICFO correlation index when a digital signal does not carry any data.

In another situation where the digital signal does not carry any data, e.g., when a television channel does not transmit any television program signals, the ICFO correlation value generated by the ICFO estimation and spectrum reversion detection circuit 410 is as shown in FIG. 8. FIG. 8 shows a relationship diagram between an ICFO correlation value and an ICFO correlation index when a digital signal does not carry any data. As observed from FIG. 8, the relationship diagram does not contain any extremely large correlation values, and all of the correlation values are contrarily quite small and quite similar. Thus, when the ICFO estimation and spectrum detection circuit 410 compares the forward result and the reverse result, if no extremely large values are present in the two or extremely large values that however do not exceed a predetermined threshold are identified from the two, the ICFO estimation and spectrum reversion detection circuit 410 may determine that the digital signal does not carry any data. At this point, no control signal needs to be generated. When the OFDM baseband receiver 40 is applied at a receiver end of a television to perform channel scanning, such characteristic helps accelerating the speed of channel scanning. One reason accounting for the accelerated scanning speed is that, before the frequency offset compensation and spectrum reversion circuit 140 performs the processes of spectrum reversion and carrier frequency offset compensation, the ICFO estimation and spectrum reversion detection circuit 410 already learns whether the television channel transmits any program signals, and the OFDM baseband receiver 40 instantly interrupts the process of the current channel if it is discovered that the television channel does not transmit any program signals, and then immediately scans for a next channel. In contrast, to determine whether the digital signal carries data, a conventional solution needs to perform at least one spectrum reversion operation and carrier frequency offset compensation.

It should be noted that, in the process of ICFO correlation operation performed by the ICFO estimation and spectrum reversion detection circuit 410, the FFT circuit 160 only needs to store two consecutive OFDM symbols, e.g., $t_1$ and $t_2$ shown in FIG. 5, instead of storing one set (e.g., $t_1$ and $t_2$) for calculating the forward result and storing another set (e.g., $t_2$ and $t_3$) for calculating the reverse result, and the forward and reverse ICFO correlation results can be calculated. Thus, apart from saving the storage space of the FFT circuit 160, the calculation and determination of the ICFO estimation and spectrum reversion circuit 410 may be faster and more real-time.

Figure 9:
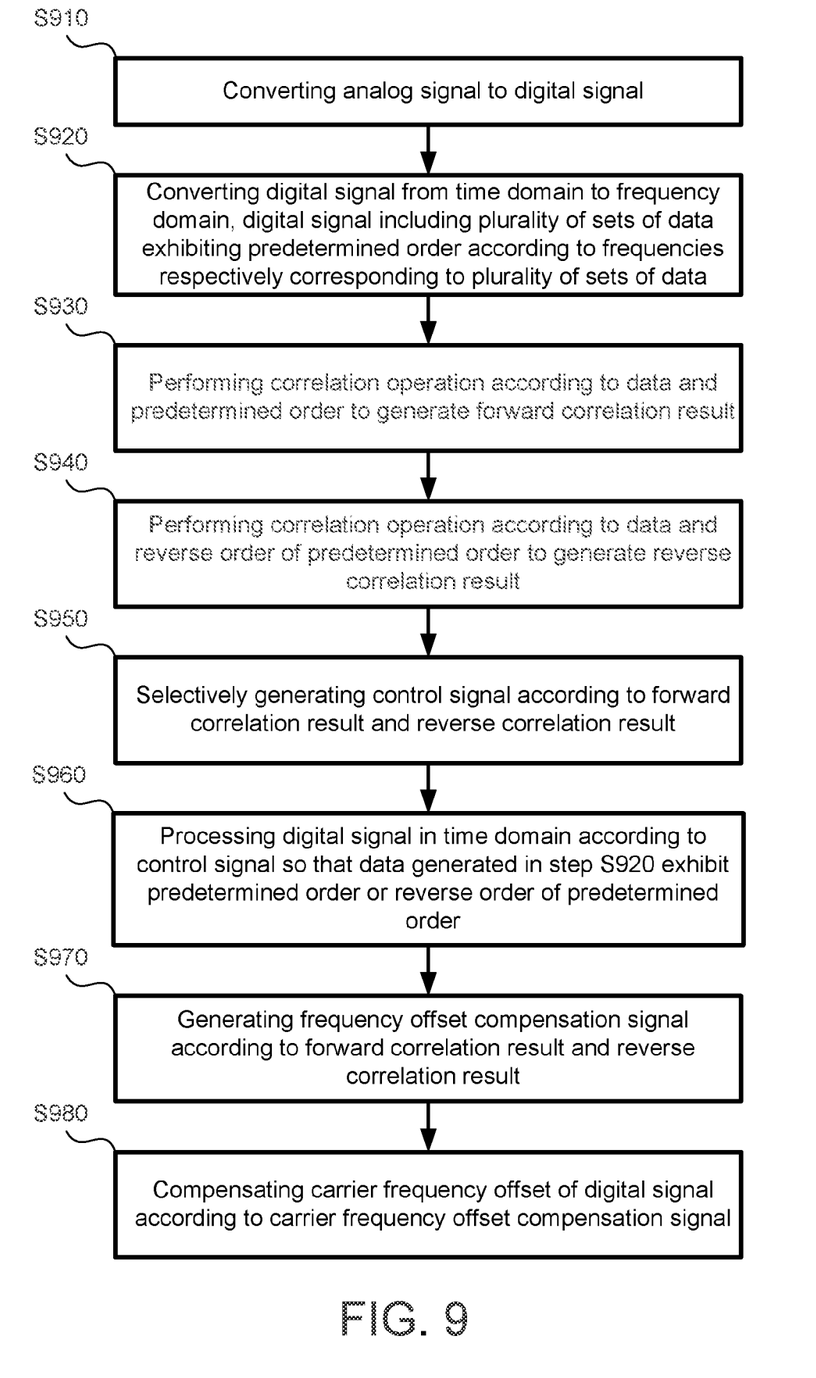
FIG. 9 is a flowchart of a signal processing method according to an embodiment of the present invention.

FIG. 9 shows a flowchart of a signal processing method according to an embodiment of the present invention. In addition to the foregoing signal processing device, the present invention correspondingly discloses a signal processing method capable of determining whether a spectrum of a signal is reversed. The method can be performed by the signal processing device 40 or an equivalent device. Referring to FIG. 9, the method according to an embodiment includes the following steps.

In step S910, an analog signal is converted to a digital signal. The signal processing method of the present invention may process a multicarrier analog signal, which may be a television signal modulated by OFDM modulation, e.g., a DVB-T or ISDB-T television signal.

In step S920, the digital signal is converted from time domain to frequency domain. The digital signal includes a plurality of sets of data, which exhibit a predetermined order according to frequencies respectively corresponding to the data. The digital signal is converted to frequency domain for subsequent operations by FFT. As the digital signal includes multiple subcarriers, each symbol of the digital signal includes a plurality of sets of data. As shown in FIG. 7, the sets of data correspond to frequencies of respective subcarriers, and exhibit an order associated with the frequencies in frequency domain. If a predetermined order is based on the frequencies in an increasing order, the arrow A in FIG. 7 represents the predetermined order.

In step S930, a correlation operation is performed according to the predetermined order to generate a forward correlation result. As previously described, a DVB-T signal sends CP signals at fixed subcarriers, and the values sent by the CP signals are constant and the CP signals have higher energy levels. In this step, a plurality of correlation products are first obtained by calculating the data, and, according to the definition of the CP signals based on the DVB-T specification, the correlation product corresponding to the CP signals is selected from the correlation products according to the predetermined order. Taking FIG. 7 for example, for the subcarrier numbers in the direction A, the correlation product corresponding to the subcarrier numbers 2, 7 . . . 8187 and 8192 is selected for correlation operation to obtain a forward correlation result.

In step S940, the correlation operation is performed on the data according to a reverse order of the predetermined order to generate a reverse correlation result. Similar to step S930, the correlation product corresponding to the CP signals is selected according to the order of the subcarrier numbers in the direction B. That is, same as step S930, the correlation product of the subcarrier numbers 2, 7 . . . 8187, 8192 is selected for correlation operation to obtain a reverse correlation result.

In step S950, a control signal is selectively generated according to the forward correlation result and the reverse correlation result. When the digital signal is a signal carrying data instead of noise, an apparent extremely large correlation value (or referred to as a maximum correlation value) will occur in at least one of the forward correlation result and the reverse correlation result, as shown in FIG. 2. However, when the digital signal is noise instead of carrying data, no maximum value will occur in either the forward correlation result or the reverse correlation result, as shown in FIG. 8. Further, when the correlation product selected in step S930 or S940 corresponds to CP signals, due to higher energy levels of the CP signals and the regularity in values of the CP signals, a larger maximum value will appear in one of the forward correlation result and the reverse correlation result, as shown in FIG. 6. When the maximum correlation value of the forward correlation result is larger than the maximum value of the reverse correlation value, it means that the spectrum of the digital signal is correct and subsequent operations can be performed without spectrum reversion, or else it means that the spectrum of the digital signal is reversed and subsequent operations can only be performed after performing spectrum reversion. Therefore, the control signal is for controlling whether to perform the spectrum reversion. On the other hand, when no maximum value can be identified from either of the forward correlation result and the reverse correlation result or the maximum value does not exceed a predetermined threshold, it means that the digital signal is noise, and so there is no need to generate a control signal that indicates whether to perform the operation of spectrum reversion.

In step S960, the digital signal in time domain is processed according to the control signal, so that the data generated in step S920 exhibit the predetermined order or the reverse order of the predetermined order. When the control signal generated in step S950 indicates that the operation of spectrum reversion needs to be performed, the digital signal in frequency domain is processed such that the spectrum of the processed digital signal having undergone FFT is reversed from the original spectrum. That is to say, after being processed, the data generated in step S920 exhibit an order that is reversed to the predetermined order of the non-processed data. The above process may include swapping the real part and the imaginary part or obtaining a conjugate complex of the digital signal in a complex form. When the control signal indicates that the current spectrum is correct and the operation of spectrum reversion is not required, no particular process needs to be performed on the digital signal in time domain, and so the original predetermined order of the data generated in step S920 is maintained.

In step S970, a frequency offset compensation signal is generated according to the forward correlation result and the reverse correlation result. The correlation result further includes information of the carrier frequency offset, i.e., the frequency corresponding to the maximum correlation value in the correlation result. As described in step S950, the correlation result having the larger maximum correlation value is the correct correlation result. For example, when the maximum correlation value of the forward correlation result is larger than the maximum correlation value of the reverse correlation result, this step generates a frequency offset compensation signal according to the frequency corresponding to the maximum correlation value of the forward correlation result.

In step S980, the carrier frequency offset of the digital signal is compensated according to the carrier frequency offset compensation signal. The offset value of the frequency offset is obtained in step S970, and is used in this step to compensate the carrier frequency offset of the digital signal.

It should be noted that, a digital signal including CP signals is taken as an example in the description of the device and method, e.g., a digital signal compliant to the DVB-T standard or the ISDB-T differential mode standard. For the ISDB-T standard, there is a characteristic signal that can be simultaneously utilized by the differential mode and the coherent mode. System information of a particular ISDB-T subcarrier is referred to as transmission and multiplexing configuration control (TMCC) information, which is also identifiable system information compliant to certain rules. Therefore, the present invention is at least applicable to DVB-T or ISDB-T signals, or even applicable to multicarrier signals that are compliant to certain rules and have identifiable system information.

One person skilled in the art can understand details and possible implementation variations of the method in FIG. 9 according to the disclosure of the device in FIG. 4. Without affecting the full disclosure and possible implementation, such repeated description is omitted herein. In possible implementation, one skilled person in the art would selectively implement part or all technical features of any embodiment of the application or selectively combine part or all technical features of the embodiments of the application based on the disclosure of the present invention to enhance the implementation flexibility of the present invention. Further, although a DVB-T signal is taken as an example in the foregoing embodiments, based on the disclosure of the present invention, one person skilled in the art may appropriately apply the present invention to other types of multicarrier signals.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal processing device, comprising:
an analog-to-digital converter (ADC), configured to convert an analog signal to a digital signal;
a conversion circuit, configured to convert the digital signal from time domain to frequency domain, the digital signal converted to frequency domain comprising a plurality of sets of data exhibiting a predetermined order, wherein the predetermined order is associated with frequencies respectively corresponding to the plurality of sets of data;
a calculation circuit, coupled to the conversion circuit, configured to perform a correlation operation according to the data and the predetermined order to generate a forward correlation result, to perform the correlation operation according to the data and a reverse order of the predetermined order to generate a reverse correlation result, and to selectively generate a control signal according to the forward correlation result and the reverse correlation result; and a data processing circuit, coupled between the ADC and the conversion circuit, configured to process the digital signal in time domain according to the control signal so that the data subsequently generated by the conversion circuit exhibits one of the predetermined order and the reverse order.

2. The signal processing device according to claim 1, wherein the calculation circuit comprises:

a storage unit, configured to store a forward maximum correlation value of the forward correlation result and a reverse maximum correlation value of the reverse correlation result; and a comparing unit, coupled to the storage unit, configured to compare the forward maximum correlation value and the reverse maximum correlation value and to generate the control signal according to a comparison result.

3. The signal processing device according to claim 1, wherein when a forward maximum correlation value of the forward correlation result and a reverse maximum correlation value of the reverse correlation result are not greater than a predetermined value, the calculation circuit does not generate the control signal.

4. The signal processing device according to claim 1, wherein the calculation circuit further generates a compensation signal according to the forward correlation result and the reverse correlation result, and the data processing circuit compensates a carrier frequency offset of the digital signal according to the compensation signal.

5. The signal processing device according to claim 4, wherein the calculation circuit generates the compensation signal according to one of a forward maximum correlation value of the forward correlation result and a reverse maximum correlation value of the reverse correlation result, and the compensation signal indicates a frequency corresponding to one of the forward maximum correlation value and the reverse maximum correlation value.

6. The signal processing device according to claim 1, wherein the analog signal is a multicarrier signal.

7. The signal processing device according to claim 6, wherein the calculation circuit calculates the forward correlation result and the reverse calculation result according to subcarriers corresponding to continual pilot (CP) signals in the multicarrier signal.

8. The signal processing device according to claim 6, wherein the calculation circuit calculates the forward correlation result and the reverse calculation result according to subcarriers corresponding to transmission and multiplexing configuration control (TMCC) information in the multicarrier signal.

9. A signal processing method, comprising:

converting an analog signal to a digital signal;

converting the digital signal from time domain to frequency domain, the digital signal converted to frequency domain comprising a plurality of sets of data exhibiting a predetermined order, wherein the predetermined order is associated with frequencies respectively corresponding to the plurality of sets of data;

performing a correlation operation according to the data and the predetermined order to generate a forward correlation result;

performing the correlation operation according to the data and a reverse order of the predetermined order to generate a reverse correlation result;

selectively generating a control signal according to the forward correlation result and the reverse correlation result; and processing the digital signal in time domain according to the control signal so that the data generated in the subsequent step of converting the digital signal from time domain to frequency domain exhibits one of the predetermined order and the reverse order.

10. The signal processing method according to claim 9, wherein the forward correlation result comprises a forward maximum correlation value and the reverse correlation result comprises a reverse maximum correlation value, and the step of generating the control signal according to the forward correlation result and the reverse result comprises:

comparing the forward maximum correlation value and the reverse maximum correlation value, and generating the control signal according to a comparison result.

11. The signal processing method according to claim 9, wherein the step of selectively generating the control signal according to the forward correlation result and the reverse correlation result comprises:

when a forward maximum correlation value of the forward correlation result and a reverse maximum correlation value of the reverse correlation result are not greater than a predetermined value, not generating the control signal.

12. The signal processing method according to claim 9, further comprising:

generating a compensation signal according to the forward correlation result and the reverse correlation result; and compensating a carrier frequency offset of the digital signal according to the compensation signal.

13. The signal processing method according to claim 12, wherein the step of generating the compensation signal according to the forward correlation result and the reverse correlation result generates the compensation signal according to one of a forward maximum correlation value of the forward correlation result and a reverse maximum correlation value of the reverse correlation result, and the compensation signal indicates a frequency corresponding to one of the forward maximum correlation value and the reverse maximum correlation value.

14. The signal processing method according to claim 9, wherein the analog signal is a multicarrier signal.

15. The signal processing method according to claim 14, wherein the step of generating the forward correlation result and the step of generating the reverse correlation result comprise:

calculating the forward correlation result and the reverse correlation result according to subcarriers corresponding to continual pilot (CP) signals in the multicarrier signal.

16. The signal processing method according to claim 14, wherein the step of generating the forward correlation result and the step of generating the reverse correlation result comprise:

calculating the forward correlation result and the reverse correlation result according to subcarriers corresponding to transmission and multiplexing configuration control (TMCC) information in the multicarrier signal.

* * * * *